United States Patent Office 2,809,212
Patented Oct. 8, 1957

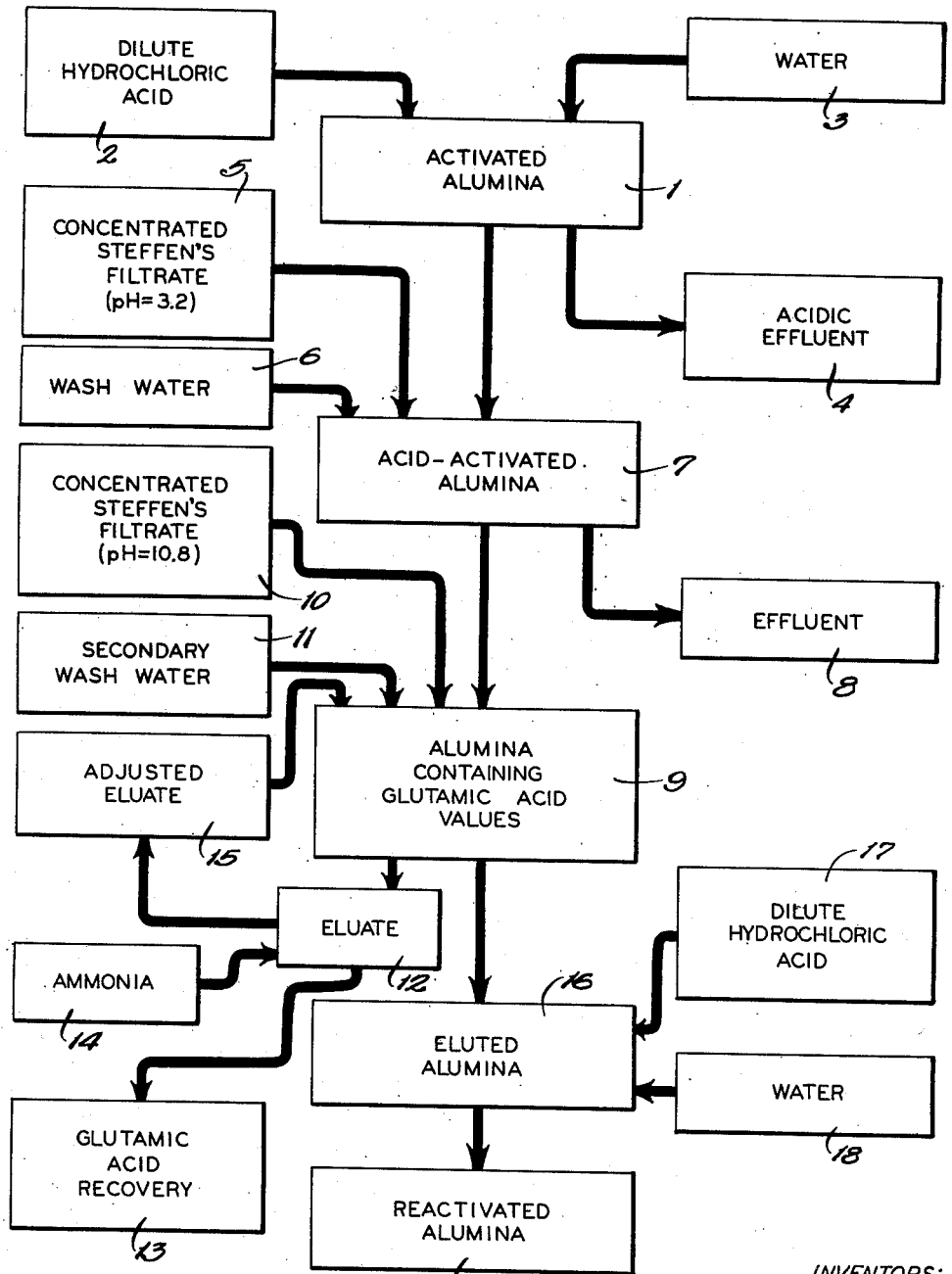

2,809,212

RECOVERY OF AMINO ACIDS

Morris J. Blish, Evanston, and Albert J. Schlaeger, Chicago, Ill., assignors to International Minerals & Chemical Corporation, a corporation of New York Application September 23, 1952, Serial No. 310,991

8 Claims. (Cl. 260—527)

This invention relates to methods for the treatment of solutions containing amino acids in order to recover them in useful form. More particularly it relates to methods for the recovery of glutamic acid and/or pyrrolidone carboxylic acid from solutions containing the same.

Columns packed with activated alumina have been used in analytical determinations to adsorb amino acids from solutions containing them. For example, when an acidic protein hydrolysate solution is passed through a column of alumina which has been treated with hydrochloric acid, it has been found that glutamic, aspartic, and pyrrolidone carboxylic acids are quantitatively adsorbed from the solution onto the activated alumina. These amino acids can be eluted or desorbed by passing an acid or an alkaline solution through the column of alumina. These amino acids are recoverable from the eluate from the column of alumina. In the past, large-scale applications or plant production based on the adsorption of glutamic acid by alumina for the recovery of glutamic acid or for up-grading raw materials containing glutamic acid or its precursor compounds has not been thought commercially feasible.

It is an object of the instant invention to provide a method for the recovery of glutamic acid values from certain amino acid-containing solutions.

It is a further object of the instant invention to provide a method for the recovery of glutamic acid and pyrrolidone carboxylic acid from glutamic acid end liquors.

It is a further object of the instant invention to provide methods for the improvement of yields of glutamic acid in recovery processes.

It is a further object of the instant invention to provide a method for the up-grading or beneficiation of filtrates from the Steffen's process, sugar beet liquors, and fermentation liquors with respect to glutamic acid values.

It is a further object of the instant invention to provide a method for the concentration of the glutamic acid values initially present in a large volume of filtrate from the Steffen's process into a small volume of concentrated Steffen's filtrate so that the liquors from which glutamic acid is recovered can be economically shipped to processors.

These and other objects of the instant invention will become more apparent upon a clearer understanding of the invention as herein described.

It has been found that amino acid-containing solutions can be enriched with respect to monoamino dicarboxylic acids, such as glutamic acid and/or pyrrolidone carboxylic acid by a process involving their adsorption onto acid-activated alumina followed by elution with a basic aqueous solution which contains at least one amino acid. For example, a glutamic acid-containing solution having a pH above about 9.5, or a filtrate from the Steffen's process may be employed as an eluting agent. While the retention of the monoamino dicarboxylic acids on the surface of the acid-activated alumina is thought to be adsorption and is referred to as adsorption in the description and the claims, there is no intention that the instant invention be limited by this theory of the manner in which the monoamino dicarboxylic acids are retained on the surface of the alumina.

By employing the instant invention, the glutamic acid values present in crude or dilute solutions are concentrated so that the glutamic acid can be recovered. By the term "glutamic acid values" in the description and the claims is meant glutamic acid itself and pyrrolidone carboxylic acid which is converted to glutamic acid by hydrolysis.

Steffen's filtrate results from the removal of most of the sucrose from beet sugar molasses. In carrying out the Steffen's process, beet sugar molasses is diluted with water and is then contacted with calcium oxide. Calcium saccharates which are relatively insoluble are formed and are filtered from the solution and are returned to the sugar process. The filtrate containing about 1 to 5 percent total solids is Steffen's filtrate or waste water. It is concentrated to form concentrated Steffen's filtrate and this is used as a raw material in the production of glutamic acid and for betaine.

In one embodiment of the instant invention an amino acid-containing solution such as unhydrolyzed filtrate from the Steffen's process is adjusted to a pH of between about one and about five and then contacted with acid-activated alumina. For example, the pH-adjusted Steffen's filtrate is stirred with or is passed through a column or bed packed with acid-activated alumina. Glutamic acid, aspartic acid, and pyrrolidone carboxylic acids are selectively adsorbed on the alumina while less acidic nitrogen compounds are not. Those acidic nitrogen compounds are then desorbed from the alumina by eluting with concentrated Steffen's filtrate. The eluate from the column contains glutamic acid, pyrrolidone carboxylic acid, and aspartic acid which were present in the filtrate. When concentrated Steffen's filtrate is employed as the eluting agent the concentrated Steffen's filtrate eluate is enriched with respect to glutamic acid and pyrrolidone carboxylic acid. Substantially all of the glutamic and pyrrolidone carboxylic acids adsorbed from the adjusted filtrate from the Steffen's process are present in the concentrated Steffen's filtrate eluate.

Filtrates from the Steffen's process, that is, either concentrated Steffen's filtrate or Steffen's filtrate, are treated in accordance with the instant process to produce an enriched filtrate which can then be processed for the recovery of glutamic acid by any conventional method; for example, the process of U. S. 2,517,601, issued to Shafor et al., or U. S. 2,519,573, issued to Hoglan. Glutamic acid is recovered from these solutions by hydrolyzing the pyrrolidone carboxylic acid present therein to glutamic acid, and glutamic acid is then separated from the solution in any conventional manner. However, the recovery of glutamic acid is more efficient from filtrates enriched with glutamic acid values because the concentration of glutamic acid in the enriched hydrolysate is higher. The end liquors from glutamic acid recovery processes contain relatively a fixed quantity of glutamic acid, and when a larger percentage of glutamic acid is present in solutions from which glutamic acid is crystallized at its isoelectric point the yields of glutamic acid are increased.

In one embodiment of the instant invention a filtrate from the Steffen's process, which may be a dilute or a concentrated solution, and having a pH between about two and about four is contacted with acid-activated alumina packed into a column. Glutamic acid and pyrrolidone carboxylic acid which are present in the filtrate are adsorbed on the alumina; substantially all of the glutamic acid values remain adsorbed on the alumina while the other solids may be removed by washing with water. The glutamic acid and pyrrolidone carboxylic acid are eluted from the alumina by contact with a filtrate from the Steffen's process; for example, by passing the filtrate through the alumina column. The filtrate eluting agent generally contains or is adjusted to between about 25% and about 50% solids. Filtrates containing a percent of solids substantially higher than about 50% are generally too viscous to flow freely through the column. The resulting eluate contains in addition to the glutamic acid values present in the Steffen's filtrate eluting agent, also the glutamic acid and pyrrolidone carboxylic acid, and aspartic acid which had been adsorbed onto the alumina, and the concentrated Steffen's filtrate eluate is enriched with respect to the glutamic acid values.

The alumina must initially be activated with acid by contacting the commercially available activated alumina with dilute hydrochloric acid, or other suitable mineral acid such as sulfuric or nitric acid and then packed into a column and contacted with water until the pH of the effluent reaches between about 2.0 and about 4.0, preferably between about 2.5 and about 3.5. The alumina has a mesh size between about 4 and about 200 mesh, preferably between about 28 and about 48 mesh. The size of the alumina should be small in order to provide a maximum of adsorbing surface, but not so small that the column becomes clogged.

The filtrate is percolated through the alumina column at a rate depending upon the dimension of the column and the mesh size of the alumina. The concentrated Steffen's filtrate eluate can be recycled to further enrich it with respect to glutamic acid and pyrrolidone carboxylic acid. For example, the glutamic acid and the pyrrolidone carboxylic acid are adsorbed from an additional amount of filtrate by acid-activated alumina and are eluted from the alumina with the concentrated Steffen's filtrate eluate to which alkali, preferably ammonia, has been added to restore its basicity, for example, to a pH above about 9.5.

For a clearer understanding of the instant novel process, reference may be had to the figure which is a flowsheet of an embodiment of the invention.

A column is packed with about 475 lbs. commercial activated alumina 1 of between about 28 and about 48 mesh size, and then about 475 lbs. of about two normal hydrochloric acid 2 and then water 3 is allowed to percolate through the column until the pH of the effluent 4 is between about 2.5 and about 3.5; about 150 lbs. of concentrated Steffen's filtrate 5 which has been adjusted to a pH between about 2.0 and about 4.0, preferably about 3.2, with hydrochloric acid and which contains about 2.8% total glutamic acid is allowed to percolate through the column of acid-activated alumina 7. Wash water 6 is then passed through the columns. The effluent 8 from the alumina column 7 can be treated to recover betaine. Concentrated Steffen's filtrate 10 having a pH between about 10 and about 11.5 and containing about 2.8% glutamic acid is then passed through the alumina containing the glutamic acid values 9, to elute the glutamic and pyrrolidone carboxylic acids which are collected in the eluate 12. Wash water 11 is then passed through the column. The eluate 12 contains about 5.8% total glutamic acid and can be conducted to glutamic acid recovery 13 or can be adjusted with ammonia 14 to obtain an adjusted eluate 15 having a pH of about 11.0. The adjusted eluate 15 is recycled as the eluting agent to the alumina column 9 to further increase the glutamic acid content of the solution. The alumina 16 after elution is regenerated with about two normal hydrochloric acids 17, and water 18 is passed through the column until the effluent had a pH of between about 2.5 and about 3.5. The reactivated alumina 19 is used to adsorb the glutamic acid values from additional raw material.

The instant invention is employed to up-grade both Steffen's filtrate and concentrated Steffen's filtrate. Steffen's filtrate is obtained from the Steffen's process and consists of a dilute aqueous solution generally containing between about 95% and about 99% water and between about 1% and about 5% of a complex mixture of organic and inorganic compounds. The inorganic compounds include the salts of sodium, potassium, and calcium, while the organic compounds include sucrose and other sugars, glutamic acid, pyrrolidone carboxylic acid, aspartic acid, betaine, and other amino acids. When this Steffen's filtrate is concentrated to a specific gravity of about 1.2 to 1.4, it is commonly known as concentrated Steffen's filtrate. The filtrate is adjusted to a pH of between about 2.0 and about 4.0, and between about 0.5% and about 70% solids, preferably to between about 30% and about 40% solids before it is contacted with the acid-activated alumina.

Concentrated Steffen's filtrate employed as the eluting agent is generally diluted to between about 25% and 50% solids in order to reduce the viscosity of the solution. Between about 50 and about 200 grams of concentrated Steffen's filtrate equivalent are required to elute a gram of glutamic acid or pyrrolidone carboxylic acid. The alumina is reactivated with a mineral acid such as hydrochloric acid. The alumina is treated with an excess of dilute mineral acid; for example, about 100 ml. of about two normal solutions of hydrochloric acid is added for every 100 grams of alumina packing. The spent acid is drained off and water is then allowed to percolate through the column until the pH of the effluent is between about 2.0 and about 4.0, preferably about 3.2.

The instant invention is applicable to any amino acid-containing solution containing glutamic acid and/or pyrrolidone carboxylic acid. The amino acid-containing solution fed to the alumina has or is adjusted to a pH between about two and about four. For example, concentrated Steffen's filtrate is adjusted with hydrochloric acid. The adjusted solution is passed through the column. By the term "amino acid-containing solution" is meant a solution containing among the nitrogen compounds, glutamic acid or pyrrolidone carboxylic acid or both. For example, the instant invention is applicable to Steffen's filtrate, concentrated Steffen's filtrate, hydrolysates of concentrated Steffen's filtrate and of proteins, such as corn or wheat gluten, end liquors from the production of glutamic acid from said hydrolysates, from fermentation residues from beet sugar molasses, and the like.

In another embodiment, glutamic acid values are recovered from a glutamic acid end liquor. By the term "end liquor" is meant a protein or concentrated Steffen's filtrate hydrolysate from which part of the glutamic acid has been separated by crystallization. The end liquor usually contains about 2.5% of glutamic acid and contains up to about 60% solids. About 40 grams of the end liquor which has a pH of between about two and about four is diluted with about 40% to 60% water, filtered to remove precipitated colloids and is contacted with between about 200 and about 250 grams of acid-activated alumina. The amino dicarboxylic acids are adsorbed onto the alumina. The acids are eluted with between about 200 and about 250 grams of concentrated Steffen's filtrate. The concentrated Steffen's filtrate eluate can be recycled to the step in which protein or Steffen's filtrate are hydrolyzed or the eluate can be separately subjected to hydrolysis to convert the pyrrolidone carboxylic acid to glutamic acid.

In another embodiment of the instant invention a protein hydrolysate, which contains glutamic acid, and which has a pH between about two and about four, is contacted with the acid-activated alumina; for example, the protein hydrolysate is passed through a column of the alumina as previously described. After washing the alumina the glutamic acid values are eluted from the column with a filtrate from the Steffen's process or with an additional amount of a protein hydrolsate, which has been adjusted to a pH above about 9.5, for example, with ammonia. When an adjusted protein hydrolysate is employed as the eluting agent, the eluate is a glutamic acid enriched protein hydrolysate. Glutamic acid is recovered from the enriched hydrolysate by any conventional method, for example, the method described and claimed in U. S. 2,463,877, issued to Hoglan.

To facilitate a clearer understanding of the instant novel process, but with no intention of being limited therein, the following examples are given.

*Example I*

About 40 grams of concentrated Steffen's filtrate having a specific gravity of about 1.3 and adjusted to a pH of about 3.2 and a total of 4.99% glutamic acid values was percolated at a rate of between about 5 and about 10 ml. per minute through a column packed with about 200 grams of between about 28 and about 48 mesh size hydrochloric acid-activated alumina. The glutamic acid, pyrrolidone carboxylic acid and aspartic acid from the concentrated Steffen's filtrate were adsorbed and the non-adsorbed material was washed from the alumina with about 200 grams of water. The glutamic acid values were then eluted from the alumina with about 160 grams of concentrated Steffen's filtrate diluted to about 40% solids. In one cycle the glutamic acid content of the eluate was increased 25%, that is from about 4.99% to about 6.25%. This concentrated Steffen's filtrate eluate was then used to elute the glutamic acid values adsorbed from another 40 gram batch of concentrated Steffen's filtrate. In this second cycle because of the neutralizing power of the acid-activated alumina and of the acids eluted in the first cycle about 12 mls. of ammonia water was added to the concentrated Steffen's filtrate eluate before the second elution to restore its basicity to a pH above 9.5. After a third and fourth cycle was carried out in the same fashion, the resulting eluate contained substantially all of the glutamic acid equivalent from 320 grams of concentrated Steffen's filtrate and the non-glutamic acid content of only 160 grams. The eluate was then concentrated to produce a concentrated Steffen's filtrate having substantially double the quantity of glutamic acid in the original raw material.

The ratio of four parts by volume of concentrated Steffen's filtrate eluting agent for each part by volume of concentrated Steffen's filtrate from which the glutamic acid values have been adsorbed was maintained in order to obtain the volume of liquid necessary to fill the void spaces in the column and to displace the adsorbed materials. As an alternate procedure the concentration of the glutamic acid values in concentrated Steffen's filtrate can be doubled in one cycle instead of in four by diluting the concentrated Steffen's filtrate eluting agent four-fold with an about 4% $NH_3$ solution.

By passing Steffen's filtrate through an acid-activated alumina column and eluting with concentrated Steffen's filtrate, the glutamic acid values initially present in very dilute solution are obtained in an enriched concentrated solution, the eluate, without an evaporation step. Similarly by passing a protein hydrolysate through a column of acid-activated alumina and eluting with an additional amount of a protein hydrolysate, the pH of which has been adjusted to above about 9.5, the eluate obtained is a protein hydrolysate enriched with respect to glutamic acid.

*Example II*

About 30 grams of glutamic acid end liquor from a concentrated Steffen's filtrate hydrolysate having a pH of about 3.2 and containing about 2.5% total glutamic acid and pyrrolidone carboxylic acid combined was diluted to between about 40% and about 60% of its initial weight with water and was allowed to stand for several hours. The solution was filtered and then percolated at a rate of about 5 to 10 mls. per minute through a column packed with about 200 grams of acid-activated alumina. Non-adsorbed materials were washed from the alumina with about 200 grams of water. The glutamic acid, pyrrolidone carboxylic acid and aspartic acid were eluted from the alumina with unhydrolyzed Steffen's filtrate of about 40% solids content in the manner described in Example I. The resulting eluate was recycled to a conventional glutamic acid recovery process from concentrated Steffen's filtrate.

Having thus finally described and illustrated the character of the invention, what is desired to be secured and protected by Letters Patent is:

1. A process for the treatment of an aqueous solution containing at least one monoamino dicarboxylic acid which comprises adsorbing the said monoamino acid from said solution, which has been adjusted to a pH between about two and about four, by contact with hydrochloric acid-activated alumina, eluting the adsorbed acids from the alumina with a filtrate from the Steffen's process of between about 25% and about 50% solids and having a pH above about 9.5, and collecting the Steffen's filtrate eluate which is enriched with glutamic acid values.

2. A process for the treatment of a filtrate from the Steffen's process which comprises contacting said filtrate which has been adjusted to a pH between about one and about five with sufficient acid-activated alumina to substantially completely adsorb the glutamic acid values from the filtrate, and eluting the glutamic acid, pyrrolidone carboxylic acid, and aspartic acid from the alumina with a filtrate from the Steffen's process having a pH above about 9.5.

3. A process for the treatment of a filtrate from the Steffen's process which comprises contacting said filtrate which has been adjusted to a pH between about two and about four with sufficient hydrochloric acid-activated alumina to substantially completely adsorb the glutamic acid values from the filtrate, eluting the glutamic acid, pyrrolidone carboxylic acid, and aspartic acid from the alumina with a filtrate from the Steffen's process of between about 25% and about 50% solids content and having a pH above about 9.5 hydrolyzing the pyrrolidone carboxylic acid in the eluate to glutamic acid, and recovering glutamic acid from the resulting hydrolysate.

4. A process for the up-grading of a filtrate from the Steffen's process which comprises contacting said filtrate adjusted to a pH between about two and about four with sufficient hydrochloric acid-activated alumina to substantially completely adsorb the glutamic acid values from the filtrate, eluting glutamic acid, pyrrolidone carboxylic acid, and aspartic acid from the alumina with a filtrate from the Steffen's process of between about 25% and about 50% solids content and having a pH above about 9.5, collecting the Steffen's filtrate eluate, adjusting the pH of said eluate to above about 9.5, contacting an additional quantity of a filtrate from the Steffen's process with hydrochloric acid-activated alumina, eluting the glutamic acid, pyrrolidone carboxylic acid, and aspartic acid from the alumina with the adjusted Steffen's filtrate eluate, and collecting the secondary eluate which is enriched with glutamic acid values.

5. A process for the up-grading of a filtrate from the Steffen's process which comprises contacting said filtrate which has been adjusted to a pH between about two and about four with sufficient hydrochloric acid-activated alumina, having a mesh size between about four and about two hundred, to substantially completely adsorb the glutamic acid values from the filtrate, eluting the glutamic acid values from the alumina with a filtrate from the Steffen's process of between about 25 and about 50% solids content and having a pH above about 9.5, adjusting the pH of the eluate to above about 9.5, contacting an additional quantity of a filtrate from the Steffen's process with hydrochloric acid-activated alumina, eluting glutamic acid, pyrrolidone carboxylic acid, and aspartic acid from the alumina with the adjusted eluate, collecting a secondary eluate, hydrolyzing the pyrrolidone carboxylic acid in the secondary eluate to glutamic acid, and recovering glutamic acid from the resulting hydrolysate.

6. A process for the up-grading of filtrate from the Steffen's process which comprises contacting said filtrate which has been adjusted to a pH between about two and about four with hydrochloric acid-activated alumina of between about 28 and about 48 mesh size until the glutamic acid values are substantially completely adsorbed onto the alumina, eluting glutamic acid, pyrrolidone carboxylic acid, and aspartic acid from the alumina with a filtrate from the Steffen's process of between about 25 and about 50% solids content and having a pH above about 9.5, and collecting the Steffen's filtrate eluate.

7. In a process for the recovery of glutamic acid involving preparing a hydrolysate containing glutamic acid and the removal of glutamic acid from said hydrolysate, the improvements comprising contacting the end liquor from which the glutamic acid has been crystallized and which has been adjusted to a pH between about two and about four, with hydrochloric acid-activated alumina until the glutamic acid values are substantially completely adsorbed onto the alumina, eluting the glutamic acid values from the alumina with a filtrate from the Steffen's process having between about 25% and about 50% solids content and having a pH above about 9.5, collecting the eluate, and recycling the eluate to the step in which a hydrolysate is prepared.

8. In a process for the recovery of glutamic acid from a filtrate from the Steffen's process, involving hydrolysis of said filtrate and removal of glutamic acid from said hydrolysate, the improvements comprising contacting the end liquor from which the glutamic acid has been crystallized, and having a pH between about two and about four, with between about 28 and about 48 mesh size hydrochloric acid-activated alumina, eluting the glutamic acid values from the alumina with a Steffen's filtrate having between about 25% and about 50% solids content and having a pH above about 9.5, collecting the eluate, hydrolyzing the pyrrolidone carboxylic acid in the eluate to glutamic acid, and recycling the resulting hydrolysate to a hydrolysate from which glutamic acid is to be crystallized.

References Cited in the file of this patent

UNITED STATES PATENTS

| | | |
|---|---|---|
| 2,429,666 | Block | Oct. 28, 1947 |
| 2,586,295 | Brown et al. | Feb. 19, 1952 |
| 2,590,209 | Roberts | Mar. 25, 1952 |

OTHER REFERENCES

Lattermoser et al.: Chem. Abstracts, vol. 32, col. 6524 (1938).

Turba et al.: Ber. Deut. Chem., vol. 75, pp. 340–4 (1942).

Wieland: Chem. Abstracts, vol. 37, col. 5432 (1943).

Wieland et al.: Ber. Deut. Chem., vol. 76B, pp. 823–5 (1943).

Schramm et al.: Ber. Deut. Chem., vol. 76, pp. 373–86 (1943).

Schramm et al.: Ber. Deut. Chem., vol. 77B, pp. 417–27 (1944).

Darling: Acta Physiol. Scand., vol. 10, p. 91 (1945).

Nachod: "Ion Exchange" (Academic), p. 304 (1949).